United States Patent
Thompson et al.

(10) Patent No.: US 8,009,694 B2
(45) Date of Patent: Aug. 30, 2011

(54) WIRELESS SERVICES PROVIDER NETWORK SYSTEM AND METHOD

(75) Inventors: David Thompson, Austin, TX (US); Edward Acosta, Austin, TX (US)

(73) Assignee: Bytemobile, Inc.

( * ) Notice: Subject to any disclaimer, the term of this patent is extended or adjusted under 35 U.S.C. 154(b) by 0 days.

(21) Appl. No.: 11/686,677

(22) Filed: Mar. 15, 2007

(65) Prior Publication Data

US 2007/0211699 A1  Sep. 13, 2007

Related U.S. Application Data (63) Continuation of application No. 09/917,449, filed on Jul. 27, 2001, now Pat. No. 7,209,474.

(60) Provisional application No. 60/220,730, filed on Jul. 26, 2000.

(51) Int. Cl.
*H04L 12/66* (2006.01)

(52) U.S. Cl. ........................................ 370/466; 370/352

(58) Field of Classification Search .................. 370/466, 370/467, 352, 328, 236, 355, 356, 349, 392
See application file for complete search history.

(56) References Cited

U.S. PATENT DOCUMENTS

| | | | | |
|---|---|---|---|---|
| 5,673,322 A | * | 9/1997 | Pepe et al. ...................... | 705/52 |
| 5,905,719 A | * | 5/1999 | Arnold et al. ................. | 370/330 |
| 5,983,073 A | * | 11/1999 | Ditzik .......................... | 455/11.1 |
| 6,034,621 A | * | 3/2000 | Kaufman ...................... | 340/7.21 |
| 6,119,167 A | * | 9/2000 | Boyle et al. ................... | 709/234 |
| 6,148,405 A | * | 11/2000 | Liao et al. ..................... | 726/2 |
| 6,166,729 A | * | 12/2000 | Acosta et al. ................. | 715/719 |
| 6,275,575 B1 | * | 8/2001 | Wu ........................... | 379/202.01 |
| 6,292,833 B1 | * | 9/2001 | Liao et al. ..................... | 709/229 |
| 6,301,245 B1 | * | 10/2001 | Luzeski et al. ................ | 370/352 |
| 6,587,684 B1 | * | 7/2003 | Hsu et al. ..................... | 455/419 |
| 6,618,709 B1 | * | 9/2003 | Sneeringer ................... | 705/412 |
| 2001/0030850 A1 | * | 10/2001 | Ditzik .......................... | 361/683 |
| 2002/0174177 A1 | * | 11/2002 | Miesen et al. ................ | 709/203 |
| 2003/0095504 A1 | * | 5/2003 | Ogier .......................... | 370/235 |
| 2005/0159136 A1 | * | 7/2005 | Rouse et al. ............... | 455/412.1 |

* cited by examiner

*Primary Examiner* — Brian D Nguyen
(74) *Attorney, Agent, or Firm* — The Law Firm of H. Dale Langley, Jr. PC (57) ABSTRACT

An application service provider provides wireless access to a packetized data network, such as the Internet. The application service provider includes a server computer. The server computer is connected to the network, which is at least in part a wired network. The wired network is connected to a cellular wireless communications system. Data is communicated over the network, both wired and wireless, via OSI models, for example, according to TCP/IP protocols or specialized variants. A wireless device, such as a modem-equipped laptop computer or personal digital assistant, a web-enabled telephone, or the like, is communicatively connected to the cellular wireless communications system. The application service provider can maintain a website, including targeted content, on the server computer for access by the wireless device.

16 Claims, 5 Drawing Sheets

WIRELESS SERVICES PROVIDER NETWORK SYSTEM AND METHOD

CROSS-REFERENCE TO INCORPORATED RELATED APPLICATIONS

The present application is a continuation of U.S. patent application Ser. No. 09/917,449, filed Jul. 27, 2001, now U.S. Pat. No. 7,209,474 titled "Wireless Services Provider Network System and Method" (converted from U.S. Provisional Patent Application No. 60/220,730 entitled "Wireless Network System and Method", filed Jul. 26, 2000), and the present application is co-pending therewith and commonly owned, and the referenced application is hereby incorporated herein by this reference thereto.

The present application is also related to U.S. patent application Ser. No. 10/315,350 (converted from U.S. Provisional Application No. 60/177,329), entitled "Wireless Network System and Method", filed Dec. 9, 2002; and U.S. patent application Ser. No. 09/619,038 (converted from U.S. Provisional Patent Application No. 60/180,649), entitled "Digital Image Transfer System and Method", filed Jul. 19, 2000; and U.S. patent application Ser. No. 09/982,509, entitled "Wireless ASP Systems and Methods", filed Oct. 17, 2001; each co-pending herewith and commonly owned, and those respective applications are each incorporated herein by this reference thereto.

U.S. patent application Ser. No. 09/917,449 issued as U.S. Pat. No. 7,209,474 on Apr. 24, 2007.

BACKGROUND OF THE INVENTION

The present invention generally relates to communications systems and methods and, more particularly, relates to wireless packetized data communications providers and services and systems and methods therefor.

Wireless packetized data communications are becoming increasingly common. For example, certain cellular telephones can presently receive and display limited textual content. Some pagers presently have limited text messaging capabilities. Wireless modems can equip computing devices, such as laptop computers, personal digital assistants, and the like, for communicating over networks, such as the Internet, through wireless channels.

The presently available wireless packetized data communications are all severely restricted in capabilities because of bandwidth limitations of wireless channels for the communications. Conventional wireless modems typically communicate at about 9600 bits/second. Only small quantities of information can be communicated at such rate within reasonable time periods. Also, the wireless channels present quality of communication and interruption concerns.

Certain specialized formats and standards are presently employed and being refined for wireless data communications. One such format, Wireless Application Protocol (WAP), is being used for wireless communications over the Internet. The WAP protocol exhibits many of the same problems as the other wireless communications, including that only limited amounts of information can reasonably be communicated according to the protocol because of wireless bandwidth limitations.

It would be a significant improvement in the art and technology to provide improved wireless packetized data communications, including communications over the Internet and other networks.

SUMMARY OF THE INVENTION

An embodiment of the invention is a wireless communications network. The wireless communications network includes a wired network, a wireless channel, a wireless application service provider server computer connected to the wired network, a wireless packetized data communications provider equipment connected to the wired network, and a wireless device communicatively connected via the wireless channel to the wireless packetized data communications provider.

Another embodiment of the invention is a method of wireless communications. The method includes serving data over a wired network, receiving the data from the wired network, transmitting the data over a wireless channel, and receiving the data over the wireless channel. In other aspects, the method includes transmitting second data over a wireless channel, receiving the second data from the wireless channel, transmitting the second data over the wired network, and receiving the second data over the wired network.

Yet another embodiment is a computer readable substrate having a computer program saved thereupon. The computer program includes providing a wireless device with an on-line access to a website, the website maintained on a server computer connected to a wired network, transmitting a packetized data to the wireless device at least in part over a wireless channel, receiving the packetized data by the wireless device, transmitting a second packetized data to the server computer at least in part over a wireless channel, and receiving the second packetized data by the server computer.

Another embodiment of the invention is an application service provider for providing network access. The application service provider includes a server computer, a wired network connected to the server computer, a cellular wireless communications system connected to the wired network, and a wireless device communicatively connected to the cellular wireless communications system.

BRIEF DESCRIPTION OF THE DRAWINGS

The present invention is illustrated by way of example and not limitation in the accompanying figures, in which like references indicate similar elements, and in which.

DETAILED DESCRIPTION OF PREFERRED EMBODIMENTS

Figure 1:
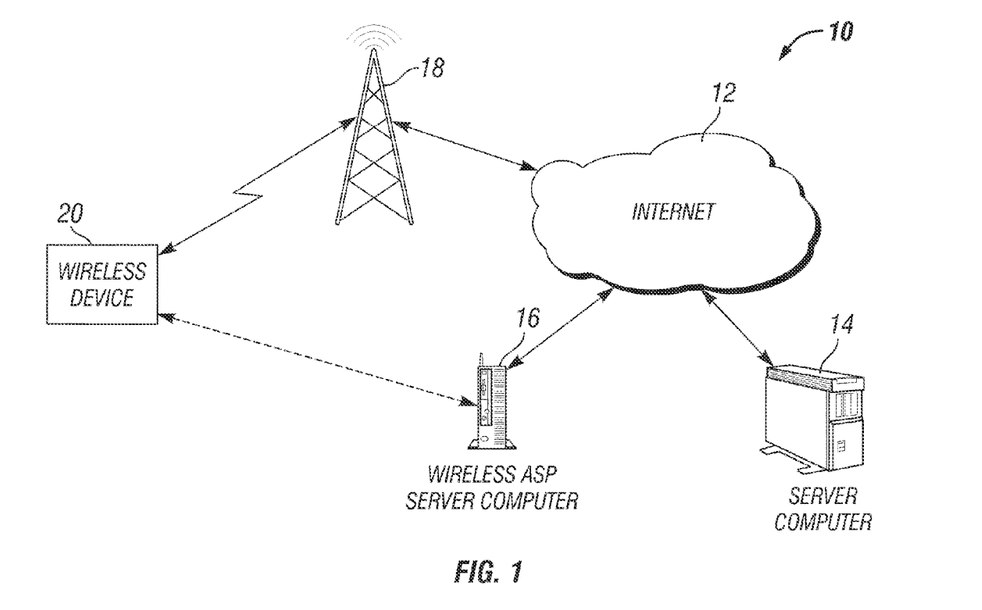
FIG. 1 illustrates a wireless application service provider (ASP) system.

Referring to FIG. 1, a system 10 serves as a wireless application service provider (ASP). The system 10 includes a network, such as the Internet 12. The network is operable according to a packetized data protocol, such as transport control protocol/Internet protocol (TCP/IP) or some other network protocol. The network, such as the Internet 12, interconnects various computing and communications devices, for example, among other devices, a server computer 14 and a wireless ASP server computer 16. The server computer 14 and the wireless ASP server computer 16 are each one or more server computers including a microprocessor, memory storage, and communications capabilities via wire or wireless connection with the Internet 12. The server computer 14 and the wireless ASP server computer 16 communicate over the Internet 12 or other network via the protocol of the network.

The network, such as the Internet 12, is also connected with a wireless communications service provider 18. The wireless communications service provider 18 is, for example, a cellular or other packetized data wireless communications network. The wireless service provider 18 connects by wire connection with the network, such as the Internet 12. Alternatively, the wireless communications service provider 18 could connect with the network 12 by other communications connection, such as fiber optic, coax cable, wireless channel, or other communications connection.

The wireless service provider 18 is capable of communicating through wireless channels with various devices, such as a wireless device 20. The wireless device 20 is a processing device, such as a data-enabled cellular telephone, a personal digital assistant, a laptop computer, or any of a wide variety of other processing devices that can wirelessly communicate with the wireless service provider 18. Of course, the wireless device 20 includes communications equipment for accomplishing the wireless communication with the wireless service provider 18, such as wireless modem.

The wireless device 20 communicates through the wireless service provider 18 and over the network, such as the Internet 12, with the wireless ASP server computer 16. The wireless ASP server computer 16 serves as a dedicated server for the wireless device 20 in its communications. The wireless ASP server computer 16 sends and receives communications to and from the wireless device 20 over the network, such as the Internet 12, and on through the wireless service provider 18. The wireless ASP server computer 16 also communicates over the network, such as the Internet 12, with other network connected devices, such as the server computer 14, via protocols in communications channels enabled for such communications on the network. In certain embodiments, for example, the wireless ASP server computer 16 and the wireless device 20 communicate with specialized protocols, such as optimized packetized data protocols, for example, optimized TCP/IP protocols or other protocols such as described in the related patent applications.

Figure 2:
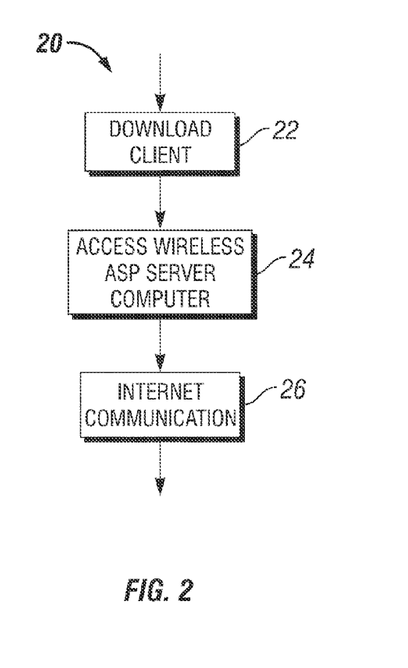
FIG. 2 illustrates a method operable on a wireless device for packetized data communications via the system of FIG. 1.

Referring to FIG. 2, a method 20 is performed by the wireless device 20. The wireless device 20 initially contacts the wireless ASP server computer 16, for example, over the network, such as the Internet 12, or is otherwise able to access the wireless ASP server computer 16 or its administrator, in order to obtain a software client for performing appropriate protocols for wireless communications between the wireless device 20 and the wireless ASP server computer 16. For example, in a step 22, the wireless device 20 downloads from the wireless ASP server computer 16 a client software that enables operations of the wireless device 20 in communications with the wireless ASP server computer 16 according to the particular protocols. As shown in phantom in FIG. 1, the wireless device 20 most likely directly accesses the wireless ASP server computer 16, such as by wired connection, to download the client software. Alternative means for download of the client software in the step 22 are possible, however, such as storage devices containing the client software can load on or make available the client software to the wireless device 20, for example, via a floppy disk or other storage mechanism.

In a step 24, after installing the client software at the wireless device 20, the wireless device 20 communicates via wireless communication with the wireless services provider 18. The wireless services provider 18 in the step 24 communicates over the network, such as the Internet 12, to the wireless ASP server computer 16, the communication from the wireless device 20. As mentioned, this communication can be performed according to specialized protocols, such as described in the related applications. Alternatively, other protocols can be employed for the initial accessing by the wireless device 20 of the wireless ASP server computer 16 in such manner.

Thereafter, in a step 26, the wireless device 20 communicates with the wireless ASP server computer 16 through the wireless channel between the wireless device 20 and the wireless service provider 18, and through the network, such as the Internet 12, between the wireless service provider 18 and the wireless ASP server computer 16. The communications in the step 26 are made according to protocols of the client software and acceptable for such communications by the wireless device 20 and the wireless ASP server computer 16. In certain embodiments, the particular protocols for such communications between the wireless device 20 and the wireless ASP server computer 16 are those protocols described in the related applications and maximized for packetized data communications systems. It is to be noted that, although the wireless device 20 and the wireless ASP server computer 16 communicate therebetween via particular protocols, the wireless ASP server computer 16 is capable of communicating with network protocols, such as protocols of the Internet 12, with other attached devices on the network. For example, the wireless device 20 can communicate a message to the wireless ASP server computer 16 according to the particular specialized protocol. The wireless ASP server computer 16 can then communicate the message to, for example, the server computer 14, over the network, for example the Internet 12, via the typical protocols followed by the network, such as TCP/IP in the case of the Internet 12.

Figure 3:
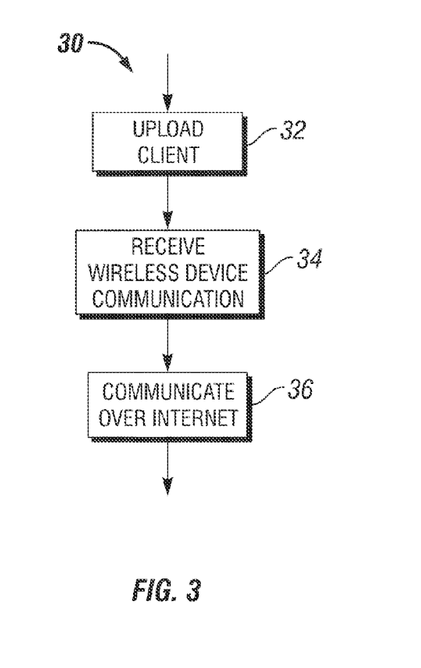
FIG. 3 illustrates a method of operation of a wireless ASP server computer of the system of FIG. 1.

Referring to FIG. 3, a method 30 is performed by the wireless ASP server computer 16. In the method 30, the wireless ASP server computer 16 uploads the client software to the wireless device 20 upon request by the wireless device 20. Alternatively, the step 32 can be performed in other manner, including by some device other than the wireless ASP server computer 16 or in some other context, such as the administrator of the wireless ASP server computer 16 can deliver a disk containing the client software to the operator of the wireless device 20 for load and installation in typical manner on the wireless device 20. Of course, all other possible alternatives for achieving the same result are included in the possible embodiments.

Thereafter, in a step 34, the wireless ASP server computer 16 receives an initial communication from the wireless device 20, which communication has traveled wirelessly to the wireless service provider 18 and then over the network, such as the Internet 12. The communication from the wireless device 20 initiates communications between the wireless device 20 and the wireless ASP server computer 16. Those communications between the wireless device 20 and the wireless ASP server computer 16 can, of course, as has been described herein, be made according to the specialized protocols in order to optimize the wireless communications.

In a step 36, the wireless ASP server computer 16 communicates over the network, such as the Internet 12, with other devices, for example, the server computer 14. These communications over the network proceed according to typical network protocols. The communications over the network in the step 36 can include communications intended for and received from the wireless device 20. In effect, the wireless device 20 delivers and receives messages to and from the wireless ASP server computer 16, and the wireless ASP server computer 16 forwards and receives on behalf of the wireless device 20 those messages over the network to network connected devices.

In operation of the system 10 and the methods 20, 30, numerous alternative business and technical arrangements are possible. In certain embodiments, the administrator of the wireless ASP server computer 16 can provide select interfaces and content to the wireless device 20. For example, the wireless device 20 can be equipped with a form of World Wide Web (WWW) browser that performs according to the specialized protocols for the communications between the wireless device 20 and the wireless ASP server computer 16. In such instance, the wireless ASP server computer 16 can provide to the wireless device 20 according to those same specialized protocols various data and information, including such things as graphics, images, voice, text, and other digitally represented information and matters.

The wireless ASP server computer 16 must also, however, be capable of communicating via typical network protocols with other network connected devices in order to receive and deliver messages from and to those network connected devices, and then transfer those messages on or receive those messages from the wireless device 20, as appropriate.

Although a single wireless device 20, a single wireless ASP server computer 16, a single wireless service provider 18, a single server computer 14, and a single network, such as the Internet 12, have been described with regard to the embodiments, it is to be expressly understood that combinations of those elements, such as a plurality of any, certain ones, or all of those elements, is possible in keeping with the scope of the embodiments herein. The network could be an intranet, or even an intranet combination or intranet-extranet combination. Numerous banks of the wireless ASP server computer 16 can be possible for receiving communications from pluralities of wireless devices, and the wireless ASP server computers can be centrally located or distributed through a wide geographic area. In the case of a global network such as the Internet, the network is capable of communicating by its protocols, which may include other specialized protocols for specific situations. The wireless ASP server computer in such instance can communicate with various devices on the network according to those other specialized protocols, if properly equipped as would be known to those skilled in the art. In general, the communications between the wireless device or devices and the wireless ASP server computer or computers occurs according to optimized protocols for wireless communications. These optimized protocols can be implemented entirely in software or alternatively can be hardware, combinations of hardware and software, or other mechanisms. The protocols of the hardware or software, as the case may be, for the wireless communications will, in any event, provide increased communications efficiency, speed, and adaptation for the wireless environment.

In certain embodiments, the wireless devices (i.e., the wireless device 20 and the wireless ASP server computer 16) are each capable of communicating according to specialized packetized data protocols (referred to as "ITP protocol"), as follows:

Packetized Data Communications Protocols

Figure 4:
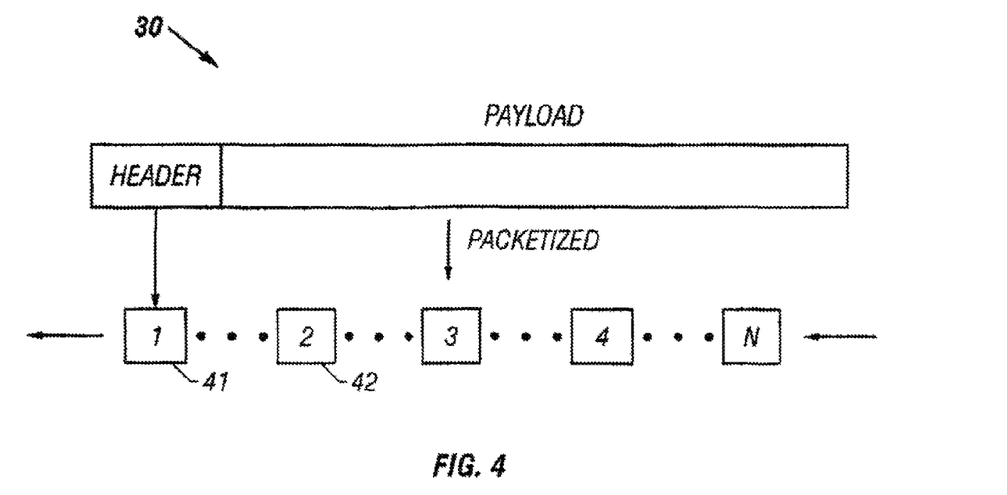
FIG. 4 is a data payload for transmission according to the protocols of embodiments of the present invention.

Transmitted Data and Data Packet Formats:

Referring to FIG. 4, an entire data payload 30 is split, or "packetized", into series of data packets 40. This packetization is performed in accordance with the process of the transport layer of the ITP protocol. The transport layer packetizes data in the data packets 40 having particular format. A first "in sequence" data packet 40 of the payload 30 is a header packet 41. The header packet 41 always contains a particular identifier, so-called a "payload header" or "header packet", for the payload 30 of interest. The header packet 41 is contained in the payload 30, in sequence, at the beginning of the payload 30 and also is duplicated generally in the middle of the payload 30 and within one of the last several data packets 40 at the end of the payload 30. The particular format of the data packets 40 of the payload 30 is hereafter described.

Figure 5:
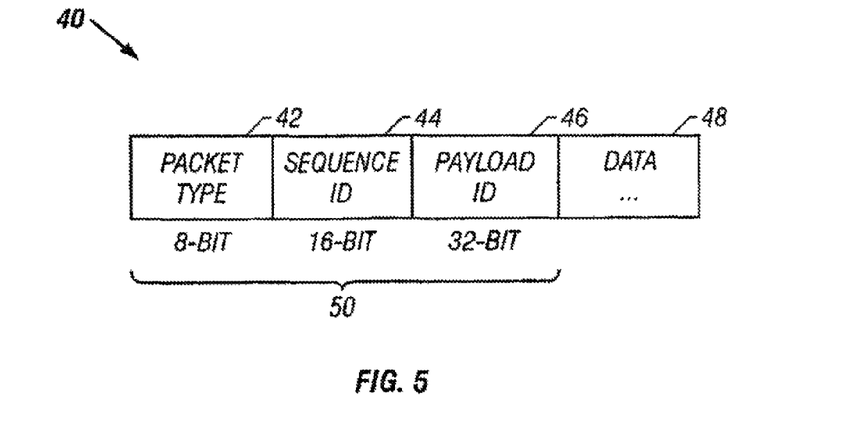
FIG. 5 is a data packet for transmission according to the protocols of embodiments of the present invention.

Referring to FIG. 5, in the ITP protocol, the data packet 40 for transmission includes a transmission header 50. The transmission header 50 comprises an 8-bit packet type 42, a 16-bit sequence ID 44, and a 32-bit payload ID 46. The transmission header 50 is the first sequence of information of each data packet 40 in communications according to the ITP protocol. The packet type 42 is employed in data type determination. The sequence ID 44 indicates the sequential location for the data packet 40 in relation to other data packets 40 (shown in FIG. 4) sent in communication of the entire payload 30 (shown in FIG. 4). The payload ID 46 serves to identify the particular payload 30 of which the particular data packet 40 is part.

Moreover, in the particular case of the header packet 41 (i.e., payload header) of the particular payload 30, the payload ID 46 identifies the header packet 41 to the particular payload 30 sent according to the ITP protocol. Thus, the payload ID 46 is a field that particularly identifies each certain data packet 40 with the particular payload 30. The payload ID 46, moreover, uniquely identifies the certain packet 40 when it is the header packet 41, as containing the header for the particular payload 30. The number of packets 40 in the particular payload 30 depends upon the size of the payload 30 and the size of the data packets 40.

If a packetizer breaks apart the data in a payload buffer into N packets, this number N is represented in the data field 48 of the data packet 40 which is the header packet 41 for the payload 30. Thus, the number N represented in the data field 48 of the unique header packet 41 for the payload 30 identifies the number of data packets 41 in the particular payload 30. As such, when a receiving device receives a header packet 41, the receiving device is able to determine how many packets 41 to expect from the transmission and in the particular payload 30. The header packet 41 may also contain other information, including data directly from the payload buffer and other data.

Received Data and Data Packet Formats

Figure 6:
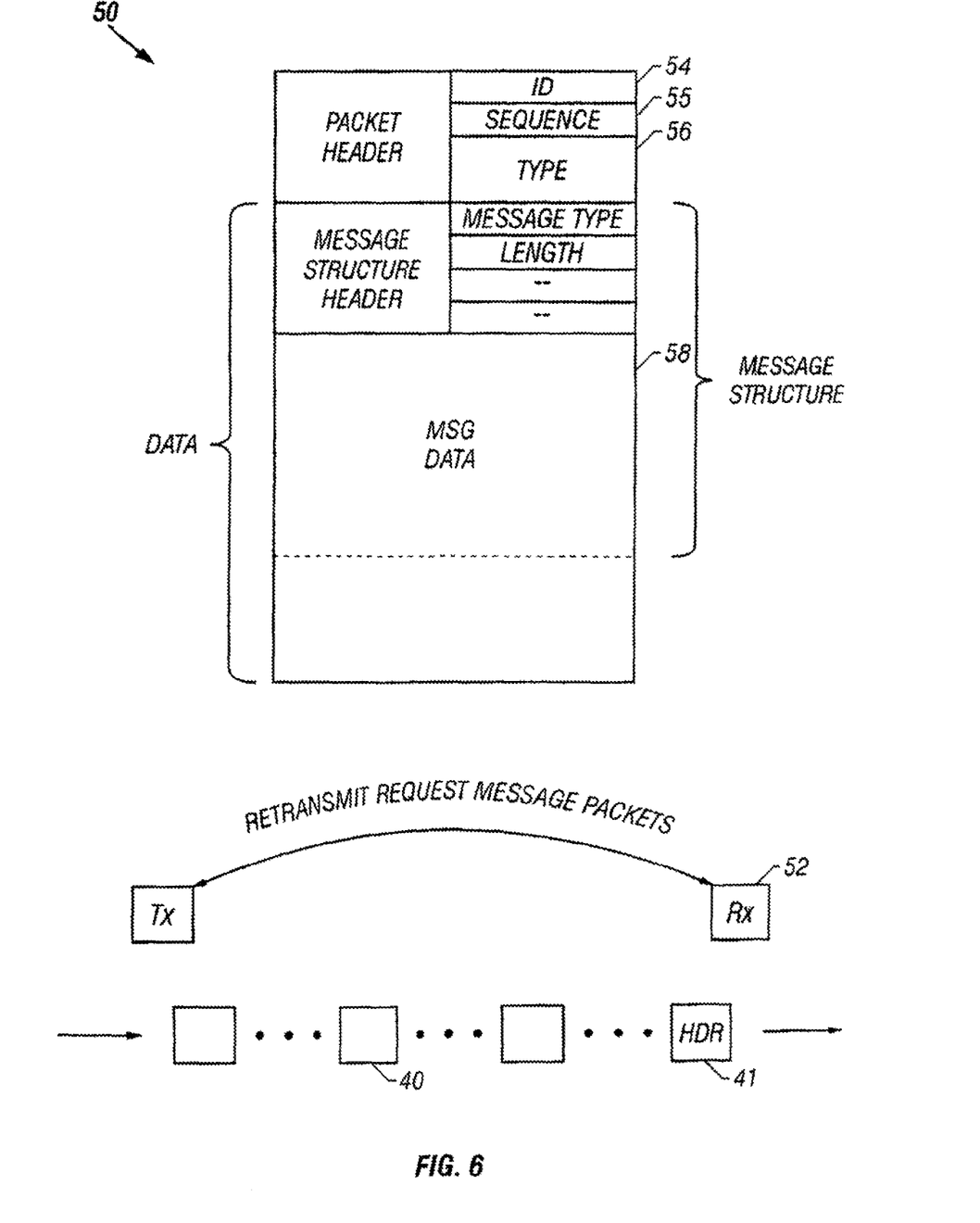
FIG. 6 is an acknowledgement message for sending by a receiving device when a header packet has been received, according to the protocols of embodiments of the present invention.

FIG. 6 is a block diagram of a retransmit request message packet 50 sent by a receiving device 52 in response to an incomplete payload 30 (shown in FIG. 4) reception, when the header packet 41 of the particular payload 30 has been received by the receiving device 52 but other data packets 40 have not been so received. The packet 50 contains a payload identification 54, identifying the payload 30 in question. The packet 50 additionally includes a sequence ID 55 and packet type 56 identification. A message field 58 of the packet 50 identifies that the header packet 41 of the received transmission was received by the receiving device 52. Another set of data identifies the packets 40 that the receiving device 52 did not receive and was unable to rebuild through forward error correction, or data heuristics, or similar process.

Figure 7:
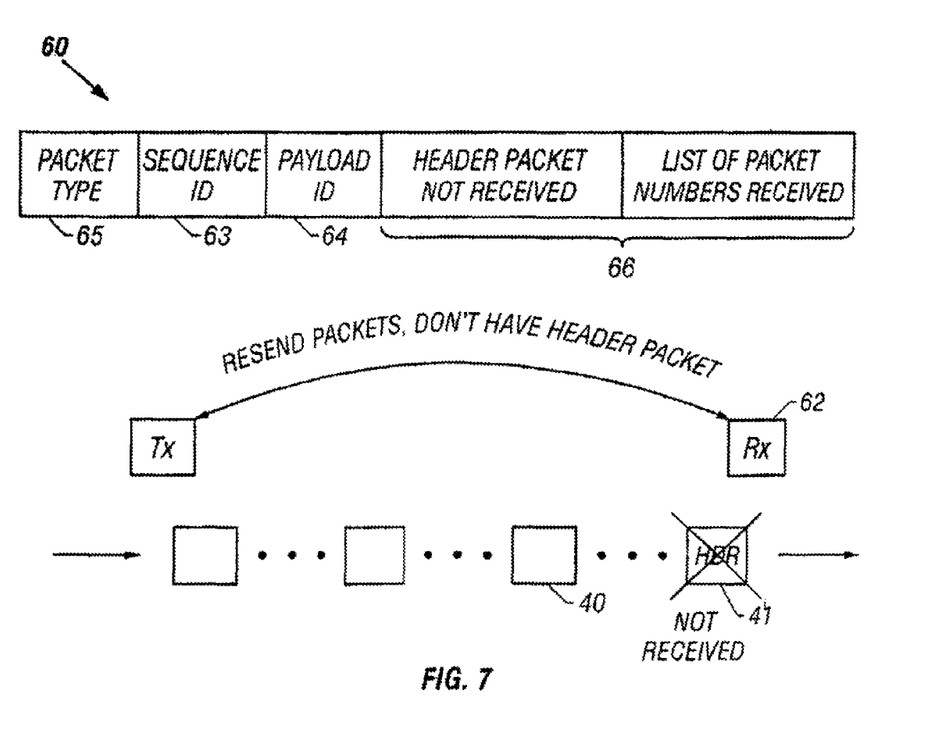
FIG. 7 is an acknowledgement message for sending by a receiving device when data packets have been received but a header packet has not been received, according to the protocols of embodiments of the present invention.

FIG. 7 is a block diagram of a resend packet 60 sent by a receiving device 62 in response to an incomplete payload 30 reception in which the header packet 41 of the particular payload 30 has not been received. The packet 60 contains a payload identification 64, identifying the payload 30 in question. The packet 62 also includes a sequence ID 63 and packet type identifier 65. A message field 66 of the packet 62 identifies that the receiving device 62 does not know how many packets 40 are in the payload 30, since the receiving device 62 did not receive the header packet 41. The resend packet 60 is sent by the receiving device 62 when a timeout is reached, after the receiving device 62 has begun to receive some data packets 40. Another block of data in the message field 62 identifies the packets 40 that the receiving device did receive, so the next transmission does not repeat those packets 40 that were received. The next transmission then resends only the header packet 41 and those packets 40 not previously received.

Figure 8:
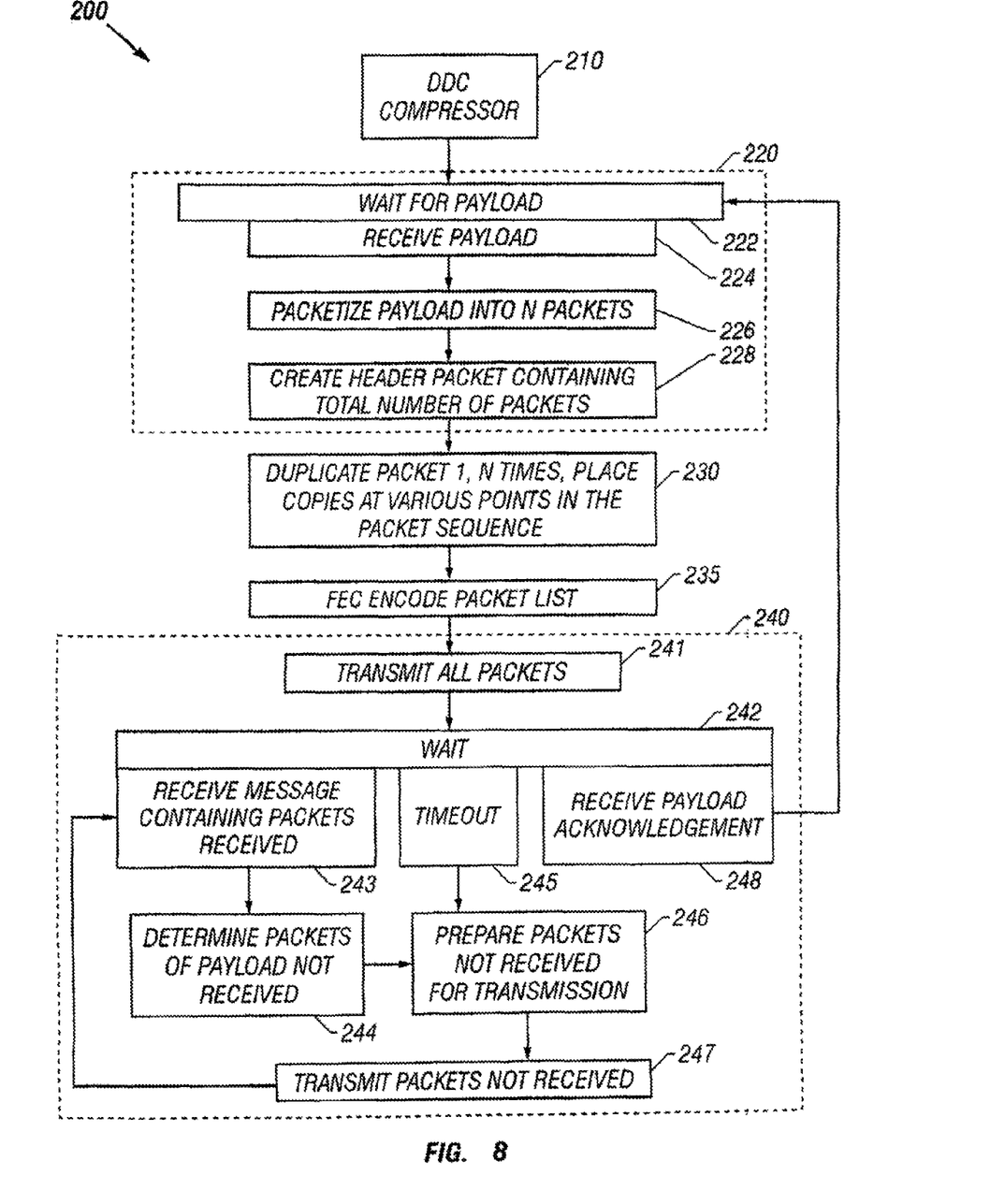
FIG. 8 is a flow diagram of a transmission procedure according to the protocols and detailing possible scenarios of operation in conjunction with a receiving protocol, according to embodiments of the present invention.

Referring to FIG. 8, a method 200 commences with the step 210 of compressing data to be transmitted. Compressed data is then packetized in the step 220. The step 220 includes several substeps as follows.

In a step 222, the method 200 waits to receive the data payload. The method 200 receives the data payload in a step 224. The data of the payload is then packetized into N packets in a step 226. Thereafter, a header packet is created in a step 228. The header packet is then duplicated in a step 230 and inserted at the beginning, middle and towards the end of the series of packets of the payload.

Once the data is packetized in the step 220, and the packets are sequenced in the step 230, FEC coding is performed on the payload in a step 235. The packets are now ready for transmission, and a step 240 of transmitting the packets follows. A step 240 of the transmission includes various steps and, depending on the efficiency and completion of transmission, can proceed along three possible routes.

In each of the routes, the payload, having been packetized with header packets inserted, is transmitted in a step 241. After transmission in the step 241, a waiting period occurs at the transmitting device in a step 242. In the waiting period of the step 242, the transmitting device will conclude or be notified that the payload was either received or not.

If the receiving device received all packets of the payload, including at least one header packet, then the receiving device sends to the transmitting device in a step 248 an acknowledgement (ACK) that the payload was received. Thereafter, the method 200 returns to the step 220 and, particularly, the step 222 of waiting for the next payload.

If, on the other hand, the receiving device only received some of the packets transmitted in the step 241, and also at least one header packet, then a step 243 follows. In the step 243, the receiver device sends to the transmitter device a message designating which packets were received successfully. In a next step 244, the transmitting device, based on knowledge of the particular packets that have been received by the receiving device from the message of the step 243, determines which packets of the payload were not received. The transmitting device then prepares the packets that were not received for re-transmission in a step 246. In a step 247, the transmission device retransmits the packets not received by the receiving device. The method 200 then returns to the step 242 and waits to again conclude or learn by receipt message whether all packets have or have not been received successfully.

If the receiving device does not receive any header packet in the original transmission in the step 241 during the waiting period of the step 242, then a timeout occurs with the transmitting device not receiving any acknowledgement or other message from the receiving device. The timeout occurs in a step 245. After the timeout in the step 245, the transmitting device retransmits the entire payload, including the header packets, in the step 246 of preparing the packets for transmission. The entire payload and header packets are then retransmitted in the step 247. After the step 247, the transmitting device returns to the step 242 of waiting for acknowledgement or timeout.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A server computer communicatively connected to a packet-switched communications network communicatively operating via packet-switched network transport protocols according to a first data payload format for a data payload, comprising:

a wireless data communications provider equipment communicatively connected to the server computer, the provider equipment for communicatively connecting to a wireless data communications channel;

means for translating the first data payload format to a second data payload format of the data payload for transmission on the wireless communications channel, the second data payload format includes series of data packets in order of a transmission header including a packet type, sequence ID and payload ID, a header packet for the data payload and a header packet for the data payload inserted at beginning, middle and near end of the data payload;

means for communicatively transmitting on the wireless data communications channel to a receiver, the data payload of the second data payload format, the second data payload format and is not directly communicatively operative on the packet-switched communications network;

means for communicatively receiving on the wireless data communications channel, in response to communicatively transmitting the data payload of the second data payload format by the means for communicatively transmitting, an acknowledgement of either: (i) if all of the series of data packets of the data payload, including at least one header packet, was received by the receiver, a payload received acknowledgement, (ii) if some but not all of the series of data packets, including at least one header packet, was received by the receiver, an identifier of the data packets received, and (iii) if no header packet but at least some of the series of data packets was received by the receiver, no acknowledgement communicated.

2. The server computer of claim 1, further comprising a client software for wirelessly communicating via the wireless data communications channel with the server computer according to the second data payload format.

3. The server computer of claim 2, wherein the packet-switched communications network operates according to an open systems interconnect model protocol.

4. The server computer of claim 3, wherein the packet-switched communications network protocol is TCP/IP.

5. The server computer of claim 2, wherein the packet-switched communications network is the Internet.

6. The server computer of claim 1, wherein the wireless communications channel is a cellular packetized data system operating for wireless communications of and to the receiver per the second data payload format for the data payload.

7. The server computer communications network of claim 1, wherein the wireless communications channel is a CDPD system operating for wireless communications of and to the receiver per the second data payload format for the data payload.

8. The server computer of claim 1, wherein the means for translating includes a server software stored by the server computer and processed by a processor of the server computer.

9. A method of communications, comprising the steps of:
serving a data payload of a first data payload format over a first communications network via a TCP/IP protocol;
receiving the data payload from the first communications network;
translating the first data payload format to a second data payload format of the data payload for transmission on a wireless communications channel, the second data payload format includes series of data packets in order of a transmission header including a packet type, sequence ID and payload ID, a header packet for the data payload and a header packet for the data payload inserted at beginning, middle and near end of the data payload;
transmitting the data payload of the second data payload format on the wireless communications channel to a receiver, the second data payload format and is not directly communicatively operative on the first communications network;
receiving on the wireless data communications channel, responsive to transmitting the data payload of the second data payload format, an acknowledgement of either: (i) if all of the series of data packets of the data payload, including at least one header packet, was received by the receiver, a payload received acknowledgement, (ii) if some but not all of the series of data packets, including at least one header packet, was received by the receiver, an identifier of the data packets received, and (iii) if no header packet but at least some of the series of data packets was received by the receiver, no acknowledgement communicated.

10. The method of claim 9, wherein the first communications network is the Internet.

11. The method of claim 10, wherein the second data payload format is optimized for the wireless channel.

12. The method of claim 11, wherein the wireless channel comprises a CDPD cellular network.

13. The method of claim 12, wherein the data payload is selected from the group consisting of: text, graphic, image, voice, and streaming media.

14. A computer readable substrate having a computer program saved thereupon, the computer program comprising the steps of:
providing an on-line access to a website, the website maintained on a server computer;
wirelessly communicating between a wireless device and the server computer via a first transport protocol, to initiate access to the website;
responding between the server computer and the wireless device with a first packetized data via the first transport protocol;
receiving the first packetized data via the first transport protocol;
transmitting a second packetized data via a second transport protocol, between the wireless device and the server computer;
receiving at least a portion of the second packetized data from the step of transmitting via the second transport protocol; and
communicating between the wireless device and the server computer via the second transport protocol, of an acknowledgement of: (i) if the second packetized data, including at least one header packet, received in the step of receiving from the step of transmitting via the second transport protocol, a payload received acknowledgement, (ii) if some packets, including at least one header packet, but not all packets received in the step of receiving from the step of transmitting via the second transport protocol, an identifier of the packets received, and (iii) if no header packet received but at least a portion of the second packetized data received in the step of receiving from the step of transmitting via the second transport protocol, no acknowledgement communicated.

15. The computer readable substrate of claim 14, wherein the computer program further comprises the steps of re-transmitting the second packetized data via the second transport protocol, between the wireless device and the server computer, if no acknowledgement is received in the step of communicating, before a timeout occurrence.

16. The computer readable substrate of claim 14, wherein the computer program further comprises the steps of:
communicating by the server computer over a network according to the first transport protocol, responsive to the step of communicating between the wireless device and the server computer via the second transport protocol; and
communicating between the wireless device and the server computer via the second transport protocol by logical determination by the server computer and the wireless device whether to re-send lost and error data packets.

* * * * *